(12) United States Patent
Sangster et al.

(10) Patent No.: US 8,108,578 B2
(45) Date of Patent: Jan. 31, 2012

(54) HIDDEN DESKTOP DIRECTOR FOR AN ADAPTIVE DEVICE

(75) Inventors: Daniel Sangster, Bellevue, WA (US); Robert Young, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 12/412,168

(22) Filed: Mar. 26, 2009

(65) Prior Publication Data

US 2010/0250801 A1    Sep. 30, 2010

(51) Int. Cl.
*G06F 3/01* (2006.01)
(52) U.S. Cl. ............................................. 710/73; 710/67
(58) Field of Classification Search ........................ None
See application file for complete search history.

(56) References Cited

U.S. PATENT DOCUMENTS

| | | | |
|---|---|---|---|
| 6,359,572 B1 * | 3/2002 | Vale ................................ | 341/23 |
| 7,171,498 B2 * | 1/2007 | Tu et al. ........................... | 710/73 |
| 7,761,175 B2 * | 7/2010 | Gutowitz et al. ................ | 700/84 |
| 2004/0036632 A1 | 2/2004 | Ford | |
| 2006/0152496 A1 * | 7/2006 | Knaven .......................... | 345/172 |
| 2008/0168187 A1 | 7/2008 | Ranta et al. | |
| 2009/0027346 A1 | 1/2009 | Srivastava et al. | |
| 2009/0033522 A1 | 2/2009 | Skillman et al. | |
| 2009/0033628 A1 | 2/2009 | Srivastava | |
| 2009/0073126 A1 | 3/2009 | Srivastava | |
| 2009/0215512 A1 | 8/2009 | Gannon et al. | |
| 2009/0309711 A1 | 12/2009 | Adappa et al. | |
| 2009/0319266 A1 * | 12/2009 | Brown et al. .................. | 704/235 |
| 2010/0042682 A1 | 2/2010 | Kaye | |
| 2010/0259482 A1 | 10/2010 | Ball | |
| 2010/0309133 A1 * | 12/2010 | Gellersen et al. ............. | 345/168 |

OTHER PUBLICATIONS

Katriend's MSDN Blog, Silverlight 2: structure of the new .XAP file (Silverlight packaged application), Mar. 16, 2008, published on <http://blogs.msdn.com/b/katriend/archive/2008/03/16/silverlight-2-structure-of-the-new-xap-file-silverlight-packaged-application.aspx>, 5 pages.

* cited by examiner

*Primary Examiner* — Cheng-Yuan Tseng
(74) *Attorney, Agent, or Firm* — Alleman Hall McCoy Russell & Tuttle LLP (57) ABSTRACT

A computing system with an adaptive input mechanism that facilitates intuitive and powerful user/computer interaction is disclosed. One example embodiment includes a logic subsystem, a display link configured to connect a display subsystem to the logic subsystem, and an adaptive device link configured to operatively couple an adaptive device to the logic subsystem. The embodiment further includes an active desktop to host an active application and present the active application on the display subsystem, the active application having active focus. An active-desktop director may pass non-adaptive-device input to the active application having active focus. The embodiment further includes a hidden desktop to host a hidden application having hidden focus specific to the adaptive device while the active application has active focus on the active desktop. A hidden-desktop director may route adaptive-device input to the hidden application having hidden focus.

17 Claims, 5 Drawing Sheets

HIDDEN DESKTOP DIRECTOR FOR AN ADAPTIVE DEVICE

BACKGROUND

Computing systems can be used for work, play, and everything in between. To increase productivity and improve the user experience, attempts have been made to design input devices that offer the user an intuitive and powerful mechanism for issuing commands and/or inputting data.

SUMMARY

An adaptive input mechanism that facilitates intuitive and powerful user/computer interaction is disclosed. One example embodiment includes a logic subsystem, a display link configured to connect a display subsystem to the logic subsystem, and an adaptive device link configured to operatively couple an adaptive device to the logic subsystem. The embodiment further includes an active desktop to host an active application and present the active application on the display subsystem, the active application having active focus. An active-desktop director may pass non-adaptive-device input to the active application having active focus. The embodiment further includes a private, non-visible desktop (i.e., a hidden desktop) to host a hidden application having hidden focus specific to the adaptive device while the active application has active focus on the active desktop. A hidden-desktop director may route adaptive-device input to the hidden application having hidden focus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is related to an adaptive device that can serve as an input device to a variety of different computing systems. The adaptive device may include one or more buttons or other devices that a user can push or otherwise activate to effectuate a desired user input. The adaptive device is capable of dynamically changing its visual appearance to facilitate user input. As a non-limiting example, the adaptive device may dynamically change the appearance of one or more buttons (e.g., change a button from displaying a "Q-key" to a "bomb-key"). The visual appearance of the adaptive device may be dynamically changed according to user preferences, application scenarios, system scenarios, etc., as described below in more detail.

Figure 1A:
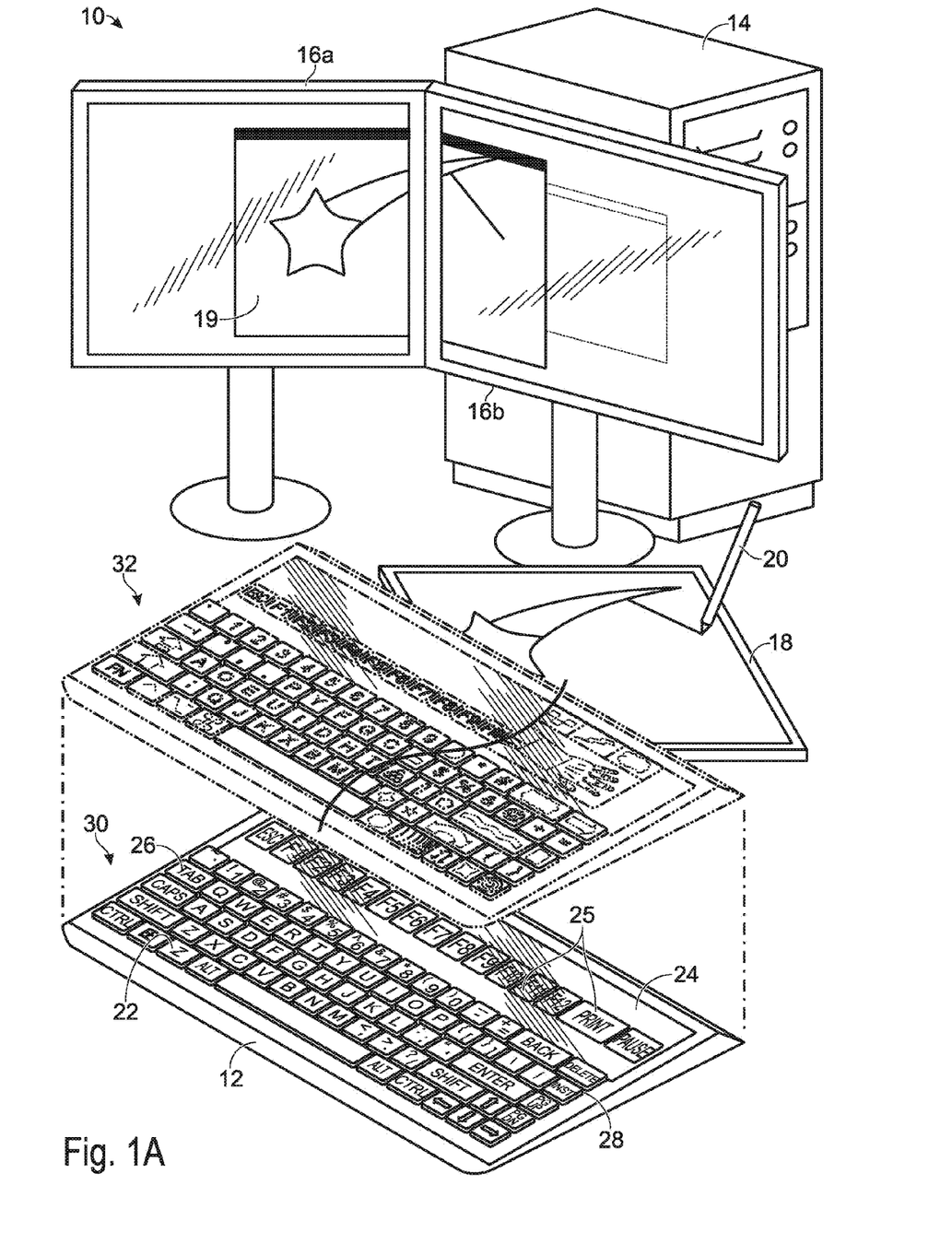
FIG. 1A illustrates a computing system including an adaptive device in accordance with an embodiment of the present disclosure.

FIG. 1A shows a non-limiting example of a computing system 10 including an adaptive device 12 that can serve as an input device with a dynamically changing appearance. The adaptive device 12 is shown connected to a computing device 14. The computing device may be configured to process input received from adaptive device 12. The computing device may also be configured to dynamically change an appearance of the adaptive device 12.

Computing system 10 further includes monitor 16a and monitor 16b that together form a non-limiting example of a display subsystem. The display subsystem may be connected to computing device 14 and may be used to visually present graphical information to a user. Computing system 10 may further include a peripheral input device 18 also connected to computing device 14. Computing device 14 may process an input received from the peripheral input device 18 and display a corresponding graphical output 19 on monitor 16a and monitor 16b. In FIG. 1A, user input may be entered in peripheral input device 18 using an input aid, such as stylus 20.

In the depicted example, adaptive device 12 is in the form of an adaptive keyboard. The adaptive device includes a plurality of keys 22, or buttons, and a touch display region 24. The plurality of keys and the touch display region may have a dynamically changeable visual appearance. Touch-display region 24 may be configured to recognize touch input from one or more fingers or other input objects (i.e., single-touch or multi-touch input). Touch display region 24 may be adaptively divided into two or more sub-regions 25 based on a variety of parameters. The sub-regions 25 may be symmetric or asymmetric in nature.

A key display 26 may be included on one or more of the keys 22. One or more of the key displays 26 may be adaptively updated to visually present different images. The adaptive device may also include a background display 28 in between keys 22. The settings of the background display 28 (e.g., background pattern, illumination intensity, color, contrast, etc.) may similarly be dynamically updated. By adjusting one or more of the key displays 26, the background display 28, and/or the touch display region 24, the visual appearance of the adaptive device 12 may be dynamically adjusted and customized. In one scenario, adaptive device 12 may have a first visual appearance, as shown at 30. In another scenario, adaptive device 12 may be dynamically changed to a second visual appearance, as shown in dashed lines at 32. Further, it should be understood that adaptive device 12 may dynamically change to visually present other images on the key displays 26, background display 28, and/or touch display region 24 and sub-regions 25.

The visual appearance of different regions of the adaptive device 12 may be customized based on a large variety of parameters. As further elaborated with reference to FIG. 1B, these may include, but not be limited to, user selected applications, user settings, system options, system state changes, display content, etc. In one example, if a user selects a word processing application, the key displays 26 may be automatically updated to display a familiar QWERTY pattern. In another example, if a user selects a graphing application, the key displays 26 may be automatically updated to display frequently used graphing options. Key displays 26 may also be automatically updated with icons, menu items, etc. from the selected application. For example, when using a word processing application, one or more key displays may be used to present frequently used word processing operations such as "cut," "paste," "underline," "bold," etc. Touch display region 24 may also display document formatting options, as an example. Based on a location in the touch display region 24 where a user touch input is received, the different formatting options may be executed. For example, in response to a user touch input received in a first touch display sub-region, a user may be able to scroll through a document. In response to a user touch input in a second touch display sub-region, a user may be able to shuffle content (for example, shuffle pages, shuffle paragraphs, etc.) within the document. The user may, optionally, further customize the updated appearance of the adaptive device based on user preferences. For example, the user may adjust the position and nature of ancillary keys, such as media buttons, volume controls, and/or quick launch buttons, by opening a keyboard control program and associating a specific function with the ancillary key.

In another example, if a user selects a gaming application, the key displays 26 and the touch display region 24 may be correspondingly updated. Updated key displays 26 may include game-specific characters, game-specific tools or weapons, game-specific environments, game-specific moves, etc. The background display 28 of the adaptive device may also be updated, based on user specified settings, to create a selected gaming ambience. For example, the background display 28 may be illuminated with a character-specific color and/or logo, as selected by the gamer. The touch display region 24 may be updated to display gaming options, such as gaming moves. For example, input to a first touch display sub-region may cause a gaming character to perform a kicking move while input to a second touch display sub-region may cause a gaming character to perform a punching move.

When providing input to more than one application, the key displays 26 of the adaptive device 12 may be configured as icons, menu items, etc. from the different applications. For example, when using a word processing application, one or more key displays 26 may enable quick access to graphing applications, slide presentation applications, internet applications, gaming applications, etc. In another example, the key displays 26 may enable user input to a word processing application while the touch display region 24 may enable user input to a gaming application. This may enable the user to minimize the number of input devices needed to operate the one or more applications. By allowing a user to customize the visual appearance of the adaptive device based on user specified settings for the one or more applications, data input by a multitasking user can be facilitated.

Figure 1B:
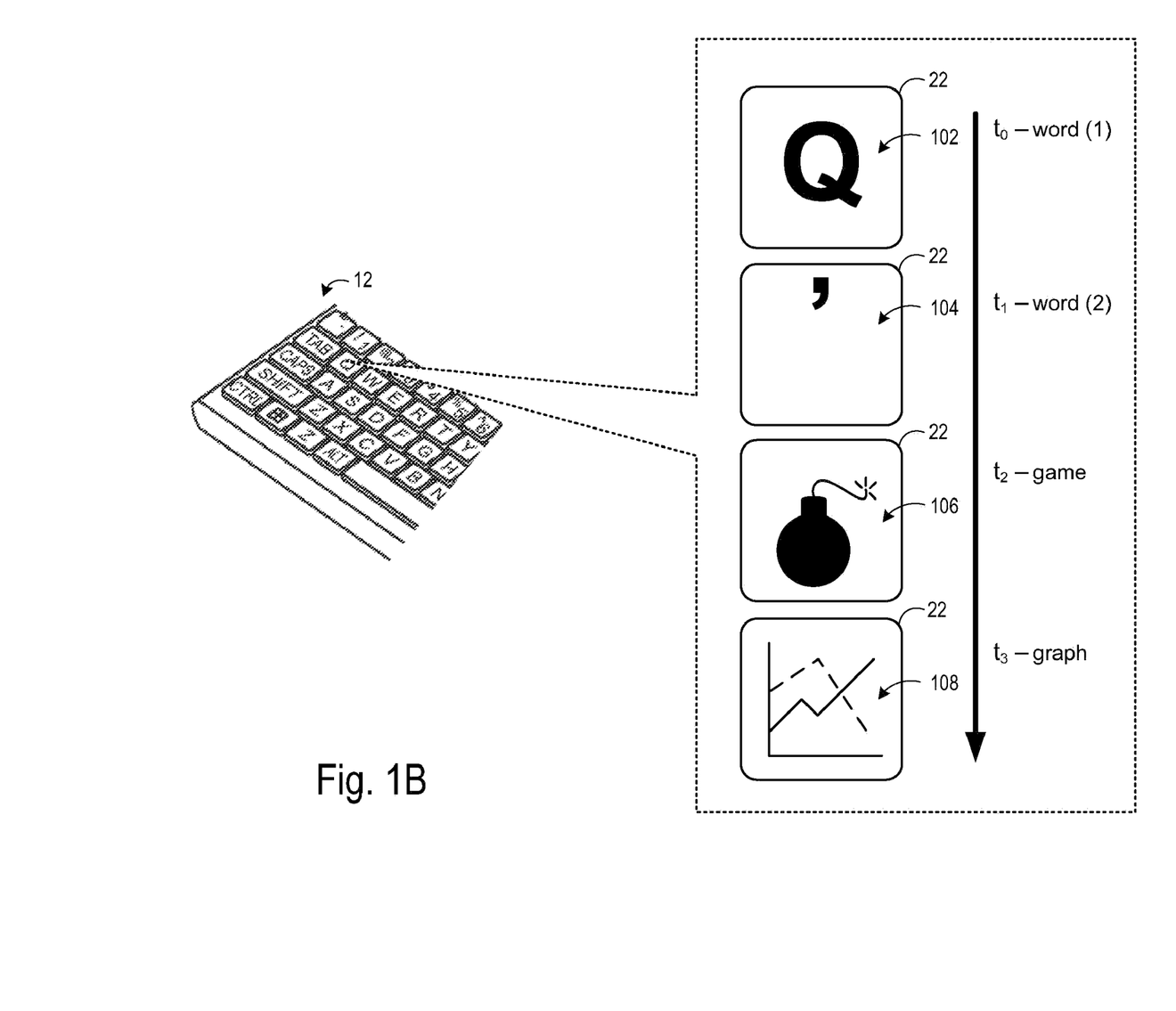
FIG. 1B illustrates dynamic updates to the visual appearance of the adaptive device of FIG. 1A.

FIG. 1B shows an example in which the image displayed on a key 22 of the adaptive device 12 is updated as a user-selected application is changed. In some embodiments, one or more of such visual updates may be performed at the same time (e.g., to different key displays, background displays, and/or touch display regions).

At $t_0$, the user may select a word processing application. Accordingly, adaptive device 12 may be configured to display a QWERTY keyboard. Specifically, FIG. 1B shows a Q image 102 of the QWERTY keyboard displayed on key 22. At $t_1$, the user may modify user settings for the word processing application to indicate a preference for a Dvorak keyboard over the QWERTY keyboard. Accordingly, the visual appearance of adaptive device 12 may be updated to show apostrophe image 104 of the Dvorak keyboard on key 22 in the same position that Q image 102 was previously displayed. At $t_2$, the user may switch to a gaming application. Accordingly, the visual appearance of adaptive device 12 may be updated to show a gaming weapon, for example, bomb image 106 on key 22. At $t_3$, the user may switch to a graphing application. Accordingly, the visual appearance of adaptive device 12 may be updated to show a graphing icon such as line plot image 108 on key 22. Thus, as an application or user setting is changed, the adaptive device dynamically updates corresponding changes to images displayed on the keys, touch display regions, and/or background display to facilitate user input to each application.

The methods and processes described herein may be tied to a variety of different computing systems. The example shown in FIGS. 1A and 1B are non-limiting. As described below, with reference to FIG. 2, a variety of different types of input devices may be used without departing from the scope of this disclosure. While FIGS. 1A and 1B use a keyboard-based adaptive device, it will be appreciated that the depicted scenario is not meant to be limiting in any way. On the contrary, the illustrated adaptive device is intended to demonstrate a general concept, which may be applied to a variety of different applications and input devices without departing from the scope of this disclosure.

Figure 2:
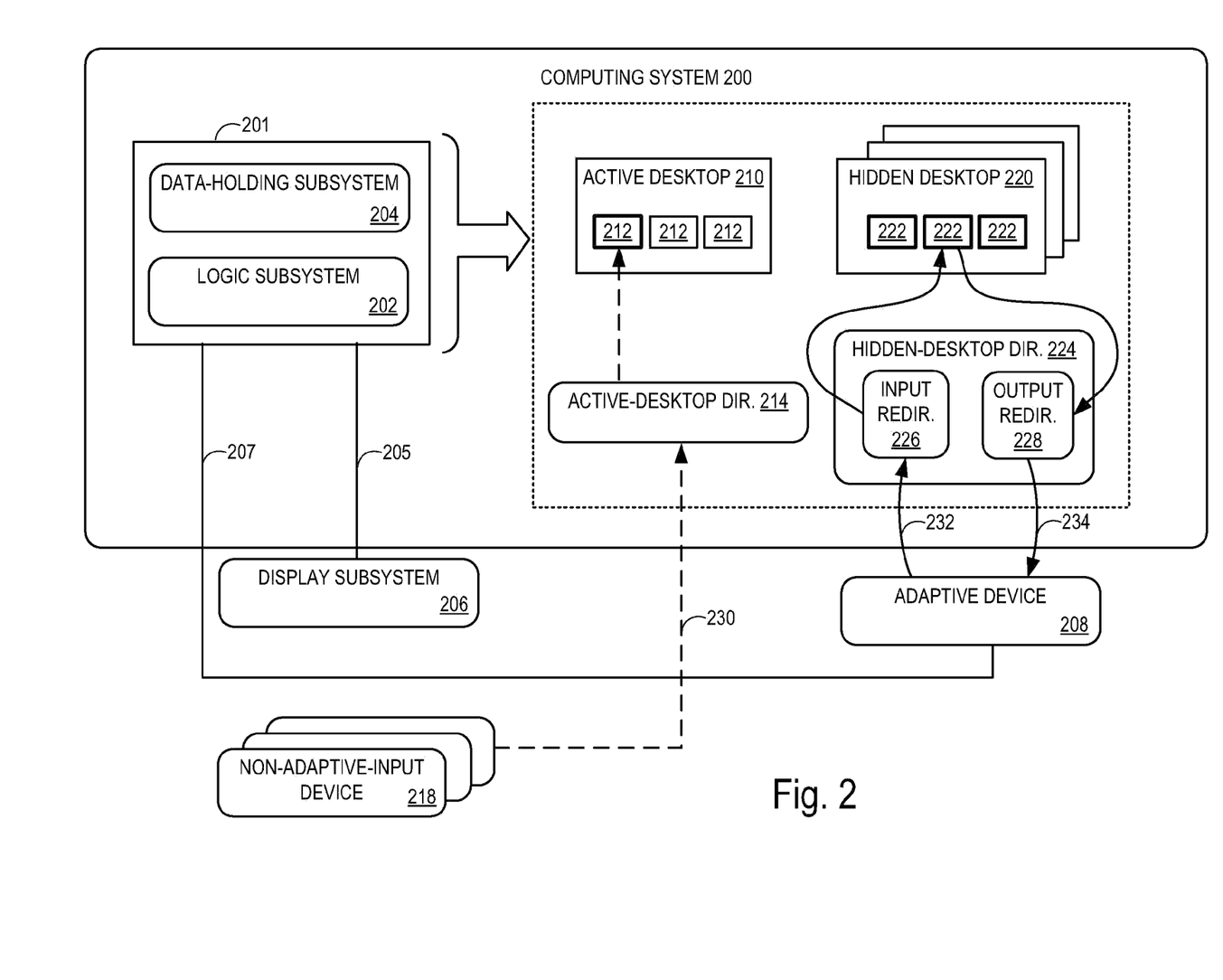
FIG. 2 schematically illustrates an exemplary system for redirecting input and output between an adaptive device and a computing device.

As another, more general example, FIG. 2 schematically shows a computing system 200 including an adaptive device 208 and a computing device 201. Herein, the computing device 201 is configured to process adaptive-device input received from the adaptive device 208, and dynamically change the visual appearance of the adaptive device.

Computing system 200 may include a logic subsystem 202, a data-holding subsystem 204, a display subsystem 206, and an adaptive device 208. The computing system may optionally include components not shown in FIG. 2, and/or some components shown in FIG. 2 may be peripheral components that are not integrated into the computing system.

Logic subsystem 202 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Display subsystem 206 may be used to visually present graphical information to a user. For example, the display subsystem 206 may be used to present a visual representation of data held by data-holding subsystem 204. Display subsystem 206 may be connected to the logic subsystem by a display link 205. As the herein described methods and processes change the data held by the data-holding subsystem 204, and thus transform the state of the data-holding subsystem 204, the state of display subsystem 206 may likewise be transformed to visually represent changes in the underlying data. Display subsystem 206 may include one or more display devices utilizing virtually any type of technology. Such display devices may be combined with logic subsystem 202 and/or data-holding subsystem 204, in a shared enclosure, or such display devices may be peripheral display devices, as shown in FIG. 1.

Computing system 200 further includes adaptive device 208 operatively coupled to the logic subsystem 202 by an adaptive device link 207. It will be appreciated that the adaptive device link 207 may provide a wired or wireless connection to the adaptive device 208 without departing from the scope of this disclosure. As shown in FIG. 1B, the visual appearance of adaptive device 208 may be dynamically changed to thereby facilitate user input into the computing system. Turning back to FIG. 2, the adaptive device 208 may be made in a variety of different ways that enable changes to the visual appearance of the device without departing from the scope of this disclosure. The inclusion of planar light guides or liquid crystal displays (LCDs) are two non-limiting examples thereof.

In some embodiments, a planar light guide in the form of a sheet of glass or other translucent material such as acrylic may be included in the adaptive device. A projector may be situated at one end of the planar light guide and may be used to project an image into one end of the sheet. The sheet may have an area of uniform thickness where the image propagates and expands. As such, the image propagates due to total internal reflectance as long as the angle of reflection is below a critical angle defined by the index of refraction of the light guide material and the index of refraction of the ambient surrounding materials. The expanded image is then received into a region of non-uniform thickness, comparable to a wedge shape, where the thickness of the material is gradually reduced. As the image progresses into the wedge, the angle of reflection becomes sharper and sharper until total internal reflection can no longer be maintained, and thus the light exits the material. The planar light guide may be quite thin, and can be used to control where light is emitted. The position that the light exits the display will depend on the angles at which the light was projected into the planar light guide. Different portions of the image projected into the planar light guide may be spatially registered to different keys, touch display regions, and/or background displays. In this way, a planar light guide enables a thin interactive display on the adaptive device. The technique enables the image to appear on the top surface of the adaptive device rather than underneath the surface where the image originated.

LCD displays may also enable thin, high quality displays on the adaptive device. An LCD layer may be provided in the adaptive device with a backlight disposed beneath the LCD layer. Display of images on the adaptive device using LCD layers may then occur with a visible portion of the backlight being selectively permitted to pass through the LCD layer with appropriate color filtering corresponding to a spatial array of apertures. In this way, a visible portion of the backlight and an LCD layer may generate an image that is projected from the LCD layer and passed through a diffusion film for display to a user on the surface of the adaptive device. Different portions of the image projected by the LCD layer may be spatially registered to different keys, touch display regions, and/or background displays.

It will be appreciated that LCD-based methods and planar-light-guide-based methods for constructing adaptive devices with dynamically changing displays are not meant to be limiting in any way. On the contrary, any other method for constructing an adaptive device with a dynamically changing display may be applied without departing from the spirit of this disclosure.

Returning to FIG. 2, data-holding subsystem 204 may include one or more physical devices configured to hold data and/or instructions executable by the logic subsystem to implement the herein described methods and processes. When such methods and processes are implemented, the state of data-holding subsystem 204 may be transformed (e.g., to hold different data). Data-holding subsystem 204 may include removable media and/or built-in devices. Data-holding subsystem 204 may include optical memory devices, semiconductor memory devices, and/or magnetic memory devices, among others. Data-holding subsystem 204 may include devices with one or more of the following characteristics: volatile, nonvolatile, dynamic, static, read/write, read-only, random access, sequential access, location addressable, file addressable, and content addressable. In some embodiments, logic subsystem 202 and data-holding subsystem 204 may be integrated into one or more common devices, such as an application specific integrated circuit or a system on a chip. In some embodiments, adaptive device 208 itself may include at least a portion of the data-holding subsystem 204.

Data-holding subsystem 204 may hold instructions to generate an active desktop 210 configured to host one or more active applications 212. The instructions may enable the one or more active applications 212 to be presented on the display subsystem 206. However, only one such active application 212 may have active focus (as schematically represented by a thicker border) at any given time. In some scenarios, an operating system may generate the one or more active applications, with only one such active application having active focus. User input received from a non-adaptive-input device 218 may then be directed to the active application 212 having focus on the active desktop 210. Virtually any type of non-adaptive-input device can be used with computing device 201 (e.g., the peripheral input device 18 of FIG. 1, a non-adaptive keyboard, a joystick, etc.) and further the computing device 201 may process the non-adaptive-device input 230 in any suitable fashion, and can do so independent of processing of the adaptive-device input 232.

Data-holding subsystem 204 may also hold instructions to generate a private, non-visible desktop configured to host one or more hidden applications 222. Such a private, non-visible desktop may be referred to as a hidden desktop 220. In one example, a hidden application 222 may be an application associated with the adaptive device 208. The adaptive-device specific hidden application may control how an adaptive-device input 232 received from the adaptive device 208 is processed. Additionally, the adaptive-device specific hidden application may optionally control a graphical output 234 directed towards the adaptive device 208 that may alter the display of one or more regions, or sub-regions, of the adaptive device 208.

The hidden application(s) 222 may have hidden focus (as represented by a thicker border) specific to the adaptive device 208 while an active application 212 has active focus on the active desktop 210. Unlike the active applications 212, the hidden applications 222 need not be displayed on the display subsystem 206. Adaptive-device input 232 may be directed to an appropriate hidden application 222 on the hidden desktop 220 while non-adaptive-device input 230 from a non-adaptive input device 218 is concomitantly directed to an appropriate active application 212 on the active desktop 210. Specifically, the data-holding subsystem 204 may hold instructions enabling an active-desktop director 214 to pass the non-adaptive-device input 230 to the active application 212 having active focus on the active desktop 210, while a hidden-desktop director 224 routes the adaptive-device input 232 to one or more of the hidden applications 222 having hidden focus on the hidden desktop 220.

In some scenarios, the user may wish to use the adaptive device 208 to provide adaptive-device input 232 to an active application 212 having focus on the active desktop 210. In this case, the hidden-desktop director 224 may be further configured to relay the adaptive-device input 232 to the relevant active application 212 on the active desktop 210, thus allowing the adaptive device 208 to serve as an input device for active applications 212 on the active desktop 210.

The selective routing of adaptive-device input 232 to a hidden application 222 on the hidden desktop 220 and of non-adaptive-device input 230 to an active application 212 on the active desktop 210 allows the display subsystem 206 to be presented to the computing device 201 as a standard display adapter and the adaptive device 208 to be presented as a standard digitizer. However, the adaptive-device input 232 may be processed concomitantly with the non-adaptive-device input 230, and the adaptive-device input 232 may be directed to an application other than the application with active focus on the active desktop. As such, developers may take advantage of standard application programming techniques and conventions while at the same time harnessing the added functionality provided by the adaptive device 208.

The hidden-desktop director 224 includes an input redirector 226 configured to relay the adaptive-device input 232. The input redirector 226 may be configured to translate the adaptive-device input 232 into a compatibility input that may be compatible with the active-desktop director 214 prior to routing adaptive-device input to one or more of the hidden applications. In one example, the adaptive-device input 232 may be translated into a compatible language and/or compatible code that may be understood by the active-desktop director 214. The translation may further involve mapping the adaptive-device input 232 to a particular one of the one or more hidden applications 222 based on a region of the adaptive device from which the adaptive-device input 232 originates. In one example, with reference to the adaptive device 12 of FIG. 1A, an input received on a key 22 of the adaptive device 12 may be mapped to a word processing application, while an input received on a touch display region 24 of the adaptive device 12 may be mapped to a gaming application. In another example, an input received on a key 22 of the adaptive device 12 may be mapped to a control button, such as an "enter" key, while an input received on a touch display region 24 of the adaptive device 12 may be mapped to a "scroll" function. Returning to FIG. 2, following translation, the input redirector 226 may route the adaptive-device input 232 to the one or more selected hidden applications 222, which may optionally provide further routing to the active application 212 having active focus. In some scenarios, the adaptive-device input 232 may be routed to a particular child window with which the user is interacting. The form of translation may be dependent on the nature of the child window. For example, when the input is mapped to a button control, the message generated may be different from a message generated when the input is mapped to a list box.

The hidden-desktop director 224 may further include an output redirector 228. The output redirector 228 may be configured to route an image from a hidden application 222 hosted on the hidden desktop 220 to the adaptive device 208 for visual presentation of the image on the adaptive device 208. Optionally, the output redirector 228 may visually update a region of the adaptive device 208 independent of other regions of the adaptive device 208. In doing so, the visual appearance of the adaptive device 208 may be changed. As further elaborated with reference to FIG. 3, each hidden application 222 may include a parent window and one or more child windows. Thus, when visually updating a particular region, the output redirector 228 may aggregate two or more different visual updates to two or more different regions of the adaptive device 208 and redraw each child window on the adaptive device independent of other child windows.

In one example, the output redirector 228 may maintain a cache of images of the parent window and child windows for each of the hidden applications 222 having hidden focus. When a child window is invalidated, a sub-image of the child window may be generated and overlaid with the child window images from the cache. Subsequently, only the sub-image may be directed to the adaptive device. By directing only a sub-image of a child window instead of the image for the whole window (parent and child window) redundancy may be reduced and efficiency may be improved. In some scenarios, the output redirector 228 may use the cache to reconstruct an entire region or display, even though only a small portion or portions of the image have changed, and then send the entire region or display to the adaptive device.

Figure 3:
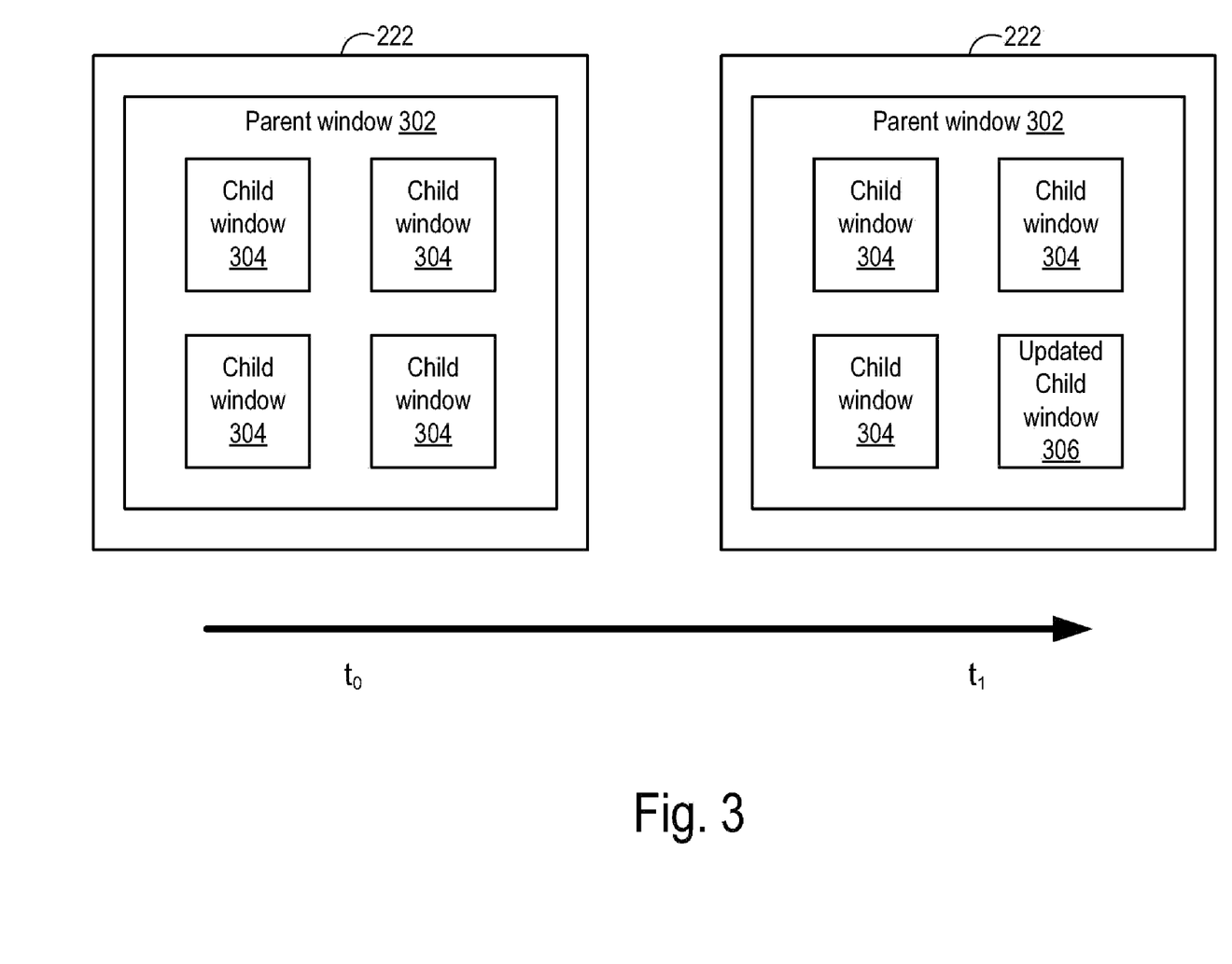
FIG. 3 illustrates dynamic updates to the visual appearance of the adaptive device of FIG. 2 by reconfiguration of parent and child windows.

FIG. 3 schematically shows an example in which the visual appearance of the adaptive device is updated by the output redirector by selectively updating specific child windows. At $t_0$, a hidden application 222 may include a parent window 302 and a plurality of child windows 304. At $t_1$, in response to an update wherein a child window 304 is invalidated, a sub-image of the updated child window 306 may be included in its place.

Figure 4:
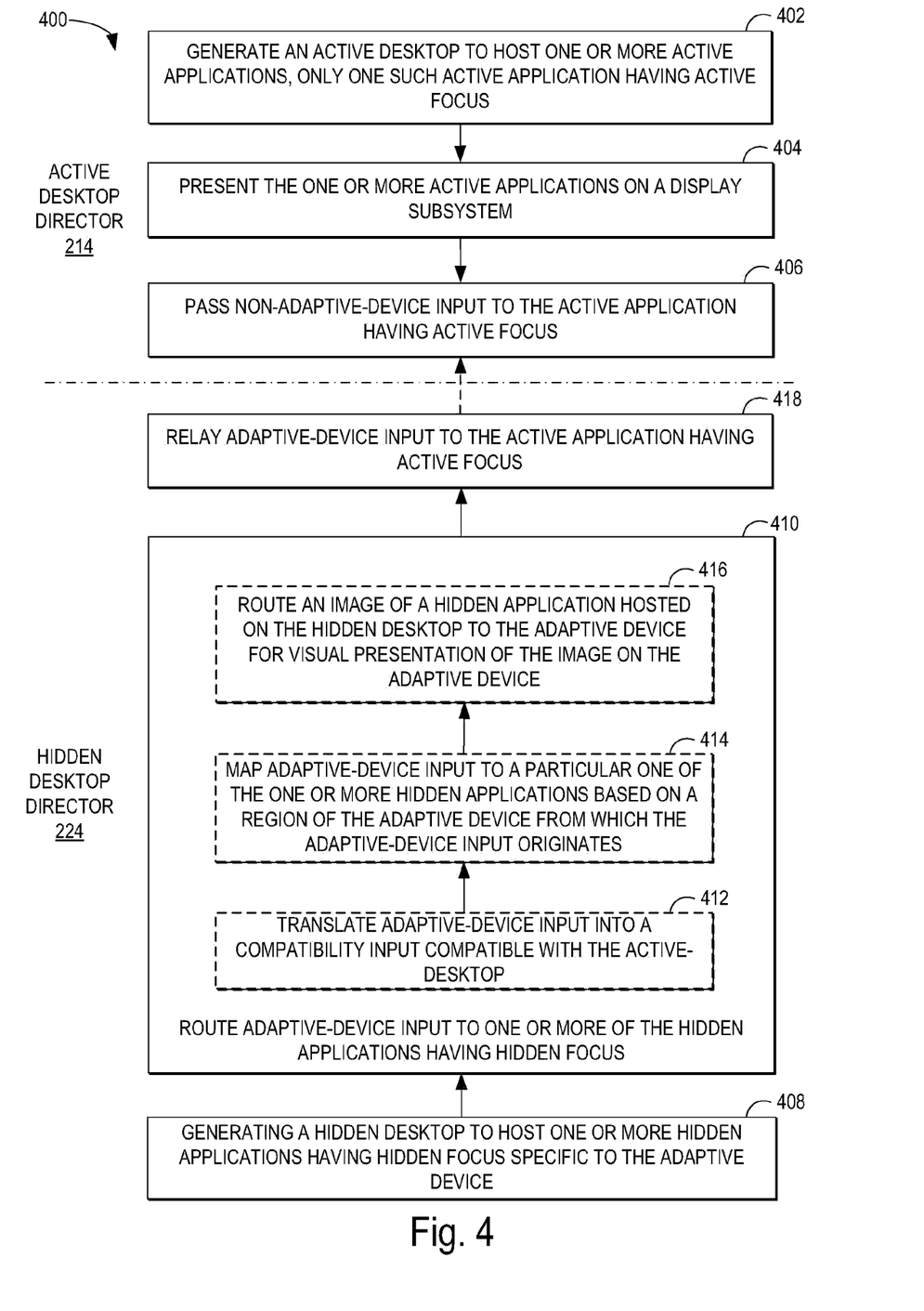
FIG. 4 shows a method for redirecting input and output between an adaptive device and a computing device.

FIG. 4 illustrates an embodiment of a method 400 for redirecting input and output between an adaptive device and a logic subsystem, the adaptive device coupled to the logic subsystem by an adaptive device link. The method 400 may be implemented using the hardware and software of the systems described above, or via other suitable hardware and software. Specifically, the method 400 allows a user to concomitantly provide user input to a hidden application hosted on a hidden desktop while an active application is hosted on an active desktop.

The method 400 may include, at 402, generating an active desktop, the active desktop hosting one or more active applications, only one such active application having active focus. The method may further include, at 404, presenting the one or more active applications on a display subsystem. At 406, the method may further include, passing non-adaptive-device input to the active application having active focus. In one example, an active-desktop director 214 (as shown in FIG. 2) may be configured to perform the steps recited at 402-406.

In parallel to steps 402-406, at 408, the method may include, generating a hidden desktop, the hidden desktop hosting one or more hidden applications, one or more such hidden applications having hidden focus specific to the adaptive device while the active application has active focus on the active desktop. At 410, the method may further include, routing adaptive-device input to one or more of the hidden applications having hidden focus. At 418p, the method may include, relaying an image of the adaptive-device input to the active application having active focus. In one example, a hidden-desktop director 224 (as shown in FIG. 2) may be configured to perform the steps recited at 408-418. It will be appreciated that steps 408-418 may be performed concomitant to steps 402-406.

Routing adaptive-device input to one or more of the hidden applications having hidden focus, as shown at 410, may further include, at 412, translating adaptive-device input into a compatibility input compatible with the active-desktop. Routing may further include, at 414, mapping adaptive-device input to a particular one of the one or more hidden applications based on a region of the adaptive device from which the adaptive-device input originates. The translation and mapping operations may be performed, for example, by an input redirector 226 (as shown in FIG. 2) of the hidden-desktop director.

At 416, the method may include, routing an image of a hidden application hosted on the hidden desktop to the adaptive device for visual presentation of the image on the adaptive device. As such, this may change the visual appearance of the adaptive device. In one example, an output redirector 228 (as shown in FIG. 2) of the hidden-desktop director may route the image, for example, by visually updating a region of the adaptive device independent of another region of the adaptive device. In one example, the visual update may be achieved by redrawing each child window of the hidden application on the adaptive device independent of other child windows.

The above described systems and methods may be implemented to enable adaptive-device input provided by a user from an adaptive device to be received and processed (on a hidden desktop) alongside an active application in operation on an active desktop.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

It is also to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
a logic subsystem;
a display link configured to connect a display subsystem to the logic subsystem;
an adaptive device link configured to operatively couple an adaptive device to the logic subsystem;
an active desktop to host an active application and present the active application on the display subsystem, the active application having active focus;
an active-desktop director to pass non-adaptive-device input to the active application having active focus;
a hidden desktop to host a hidden application having hidden focus specific to the adaptive device while the active application has active focus on the active desktop;
a hidden-desktop director to route adaptive-device input to the hidden application having hidden focus; and
an output redirector configured to route an image of the hidden application hosted on the hidden desktop to the adaptive device for visual presentation of the image on the adaptive device.

2. The computing system of claim 1, where the hidden-desktop director includes an input redirector configured to translate adaptive-device input into a compatibility input compatible with the active-desktop director prior to routing adaptive-device input to one or more hidden applications.

3. The computing system of claim 2, where the input redirector maps adaptive-device input to a particular one of the one or more hidden applications based on a region of the adaptive device from which the adaptive-device input originates.

4. The computing system of claim 1, where the output redirector is configured to visually update a region of the adaptive device independent of another region of the adaptive device.

5. The computing system of claim 4, where the output redirector is configured to aggregate two or more different visual updates to two or more different regions of the adaptive device.

6. The computing system of claim 4, where the hidden application includes a parent window and one or more child windows, and where the output redirector is configured to redraw a child window on the adaptive device independent of another child window.

7. The computing system of claim 1, where the hidden-desktop director is configured to relay adaptive-device input to the active application having active focus on the active desktop.

8. A method for redirecting input and output to and from an adaptive device, the method comprising:
generating an active desktop, the active desktop hosting one or more active applications, only one such active application having active focus;
presenting the one or more active applications on a display subsystem;
passing non-adaptive-device input to the active application having active focus;
generating a hidden desktop, the hidden desktop hosting one or more hidden applications, one or more such hidden applications having hidden focus specific to the adaptive device while the active application has active focus on the active desktop;
routing adaptive-device input to one or more of the hidden applications having hidden focus; and
routing an image of one of the one or more hidden applications hosted on the hidden desktop to the adaptive device for visual presentation of the image on the adaptive device.

9. The method of claim 8, where routing adaptive-device input to one or more of the hidden applications having hidden focus includes translating adaptive-device input into a compatibility input compatible with the active desktop.

10. The method of claim 9, where routing adaptive-device input to one or more of the hidden applications having hidden focus includes mapping adaptive-device input to a particular one of the one or more hidden applications based on a region of the adaptive-device from which the adaptive-device input originates.

11. The method of claim 8, where routing adaptive-device input to one or more of the hidden applications having hidden focus includes visually updating a region of the adaptive device independent of another region of the adaptive device.

12. The method of claim 11, where visually updating a region of the adaptive device independent of another region of the adaptive device includes aggregating two or more different visual updates to two or more different regions of the adaptive device.

13. The method of claim 11, where the hidden application includes a parent window and one or more child windows, and where visually updating a region of the adaptive device independent of another region of the adaptive device includes redrawing a child window on the adaptive device independent of another child window.

14. The method of claim 8, further comprising, relaying adaptive-device input to the active application having active focus on the active desktop.

15. A computing system, comprising:
an adaptive device including:
one or more buttons having a dynamically changeable visual appearance;
one or more touch display regions having a dynamically changeable visual appearance; and one or more background display regions having a dynamically changeable visual appearance, the background display regions recessed behind the one or more buttons;

a display subsystem; and a computing device operatively coupled to the adaptive device and the display subsystem, the computing device including:

an active desktop to host an active application and present the active application on the display subsystem, the active application having active focus;

an active-desktop director to pass non-adaptive-device input to the active application having active focus;

a hidden desktop to host a hidden application having hidden focus specific to the adaptive device while the active application has active focus on the active desktop;

a hidden-desktop director to route adaptive-device input to the hidden application having hidden focus; and an output redirector configured to route an image of the hidden application hosted on the hidden desktop to the adaptive device for visual presentation of the image on the adaptive device.

16. The computing system of claim 15, where the hidden-desktop director includes an input redirector configured to translate adaptive-device input into a compatibility input compatible with the active-desktop prior to routing adaptive-device input to one or more hidden applications.

17. The computing system of claim 16, where the input redirector maps adaptive-device input to a particular one of the one or more hidden applications based on a region of the adaptive device from which the adaptive-device input originates.

* * * * *